US007074129B2

United States Patent
Sugiyama et al.

(10) Patent No.: US 7,074,129 B2
(45) Date of Patent: Jul. 11, 2006

(54) COUPLING MEMBER OF POWER TRANSMISSION APPARATUS

(75) Inventors: Kenichi Sugiyama, Kanagawa (JP); Katsuro Kawahara, Kanagawa (JP); Hirofumi Somekawa, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/400,395

(22) Filed: Mar. 28, 2003

(65) Prior Publication Data

US 2003/0207715 A1    Nov. 6, 2003

(30) Foreign Application Priority Data

May 1, 2002    (JP)    ............................. 2002-129467

(51) Int. Cl.
    F16D 1/072    (2006.01)
(52) U.S. Cl. .................................... 464/182; 403/359.6
(58) Field of Classification Search ................ 403/14, 403/275, 280, 282, 359.1, 359.6; 464/134, 464/182; 29/525; D8/47
    See application file for complete search history.

(56) References Cited

U.S. PATENT DOCUMENTS 3,992,117 A  * 11/1976  Ristau ..................... 403/14
4,064,619 A  * 12/1977  Echols et al. ............ 29/525 X
4,124,318 A  * 11/1978  Sagady .................... 403/14
4,307,833 A  * 12/1981  Barnard .................. 29/525 X
D386,657 S  * 11/1997  Spirer ...................... D8/47
5,836,825 A  * 11/1998  Yamane ................. 464/182 X
6,190,263 B1 *  2/2001  Kimoto et al. ......... 464/182 X
2002/0041790 A1 *  4/2002  Suzuki et al. ............ 403/280

FOREIGN PATENT DOCUMENTS

JP    2001-65538 A    3/2001

* cited by examiner

Primary Examiner—Greg Binda
(74) Attorney, Agent, or Firm—Foley & Lardner LLP

(57) ABSTRACT

A coupling member for a power transmission apparatus, connected to a fiber reinforced plastic cylindrical drive shaft, is comprised of a substantially cylindrical fitting portion to be press fitted into the drive shaft. The fitting portion is comprised of a serration portion formed in the axial direction on an outer circumferential surface of the fitting portion. The edge of the fitting portion has an inclined guide surface. The tip area of the guide surface is a guide portion with a smaller outer diameter than an inner diameter of an end portion of the drive shaft. An area between the guide portion and the outer circumferential surface of the fitting portion is a cut away portion continuing from the serration portion. A tapering angle of the cut away portion is smaller than of the guide portion.

12 Claims, 4 Drawing Sheets

COUPLING MEMBER OF POWER TRANSMISSION APPARATUS

BACKGROUND OF THE INVENTION

The present invention relates to a coupling member of a power transmission apparatus for a vehicle, in particular to the structure of a coupling member for a drive shaft.

Japanese Patent Provisional Application 2001-65538 discloses a coupling member of a power transmission apparatus, applied to a drive shaft for a vehicle.

This power transmission apparatus comprises a fiber reinforced plastic cylindrical drive shaft, and universal joints which are press fitted into the ends of the drive shaft. Fitting portions of the universal joints, which enter the drive shaft, have respective serration portions formed in the axial direction on the outer surface for serration fitting with the drive shaft.

A high-precision device or jig is required in order to align the respective axial centers of a universal joint and the drive shaft into a single axis when press fitting, therefore a tapered guide surface is generally formed at the tip of the fitting portion to ensure it is properly guided during fitting as well as to ensure mutual axial alignment.

SUMMARY OF THE INVENTION

However, a guide surface according to the related art is only formed in a simple tapered shape, with an inner diameter of the edge of the tip being smaller than an inner diameter of an end portion of a cylindrical drive shaft. Fitting is accomplished by pressing the fitting portion inward using the guide surface, and the following effects can be expected during press fitting. As a first example, an instance is given where the tapering angle of the guide surface is comparatively large, that is, the rise angle from the edge of the tip to the edge of the outer circumference is large. In this first instance, frictional resistance is great as the serration ridge portions at the edge of the outer circumference of the guide surface dig into the inner circumferential surface of the inner layer of the cylindrical drive shaft, since the rise angle of the guide surface is large. Due to this, there is a possibility the very edges of the serration ridge portions will not dig into the inner circumferential surface of the inner layer cleanly, and instead, a so-called stripping effect will occur, where the fibrous inner circumferential surface is adversely scraped or peeled.

In these circumstances, the actual press fitting depth between both the serration depression-ridge portion of the fitting portion and the inner layer of the cylindrical drive shaft decreases and the frictional engaging force between both decreases, and there is the possibility that torque which is transmitted between the first shaft-end yokes and the cylindrical drive shaft will be smaller than desirable.

A second example will be explained. In an instance where the tapering angle of the guide surface is set small, the effective length of the serration portion becomes shorter, and a fitting surface area where the serration portion and the inner circumferential surface of the inner layer meet is small, so here too the frictional engaging force between both decreases and torque which is transmitted between the first shaft-end yokes and the cylindrical drive shaft is smaller. Also, since the tip portion of the guide surface is formed smaller than the inner diameter of the inner circumferential layer of the cylindrical drive shaft, the tip portion of the fitting portion must be formed longer than is necessary, meaning an undesirable increase in cost as well as weight.

It is therefore an object of the present invention to provide a coupling member of a power transmission apparatus, which is capable of ensuring the serration portion will dig in and thus prevent a stripping effect.

It is another object of the present invention to provide a coupling member of a power transmission apparatus, which will ensure an adequate fitting length between the serration portion and the drive shaft such that frictional engaging force between them is kept at a desirable level, such that torque which is transmitted between the drive shaft and the coupling members is maintained at an adequate level.

It is still another object of the present invention to provide a coupling member of a power transmission apparatus, which enables cutting down on costs, by making unnecessary a special device for aligning the respective axes.

It is a further object of the invention to provide a coupling member of a power transmission apparatus, which enables cutting down on material costs and cutting down weight, by not requiring the fitting portion be longer than necessary.

An aspect of the present invention resides in a coupling member of a power transmission apparatus comprising a fiber reinforced plastic drive shaft to be coupled, the coupling member comprising a fitting portion to be press fitted into the drive shaft, the fitting portion comprising an outer serration portion comprising serrations for digging into an inner circumferential surface of the drive shaft, a cut away portion continuing from the outer serration portion, the cut away portion tapering at a first tapering angle, and a guide portion continuing from the cut away portion, comprising a free end, the guide portion tapering to the free end at a second tapering angle, a diameter of the free end of the guide portion being smaller than an inner diameter of the fiber reinforced plastic drive shaft.

Another aspect of the present invention resides in a coupling member of a power transmission apparatus comprising a fiber reinforced plastic cylindrical drive shaft comprising a plurality of end portions, the coupling member comprising a substantially cylindrical fitting portion, which comprises an end portion, to be press fitted into an end portion of the cylindrical drive shaft during press fitting, a serration portion, formed in the axial direction on an outer circumferential surface of the fitting portion to dig into an inner circumferential surface of the cylindrical drive shaft, and an inclined guide surface comprising a tip area, formed on the end portion, continuing from the serration portion in the axial direction for guiding the end portion into an end portion of the cylindrical drive shaft, an edge of the tip area being formed with a smaller outer diameter than an inner diameter of an end portion of the cylindrical drive shaft, a diameter of the tip area gradually decreasing in the direction of the edge of the tip.

Another further aspect of the present invention resides in a coupling member of a fiber reinforced plastic drive shaft, the coupling member fixedly inserted in the fiber reinforced plastic drive shaft, the coupling member comprising a fitting portion to be press fitted into the drive shaft, which further comprises an outer serration portion comprising serrations for digging into an inner circumferential surface of the drive shaft, and a tip portion continuing from the outer serration portion formed into a plurality of concentric surfaces tapering inward in gradually decreasing diameters.

The other objects and features of this invention will become understood from the following description with reference to the accompanying drawings.

DETAILED DESCRIPTION OF THE INVENTION

Referring to FIGS. 1 through 4, there is discussed a first embodiment of a coupling member of a power transmission apparatus in accordance with the present invention.

Figure 4:
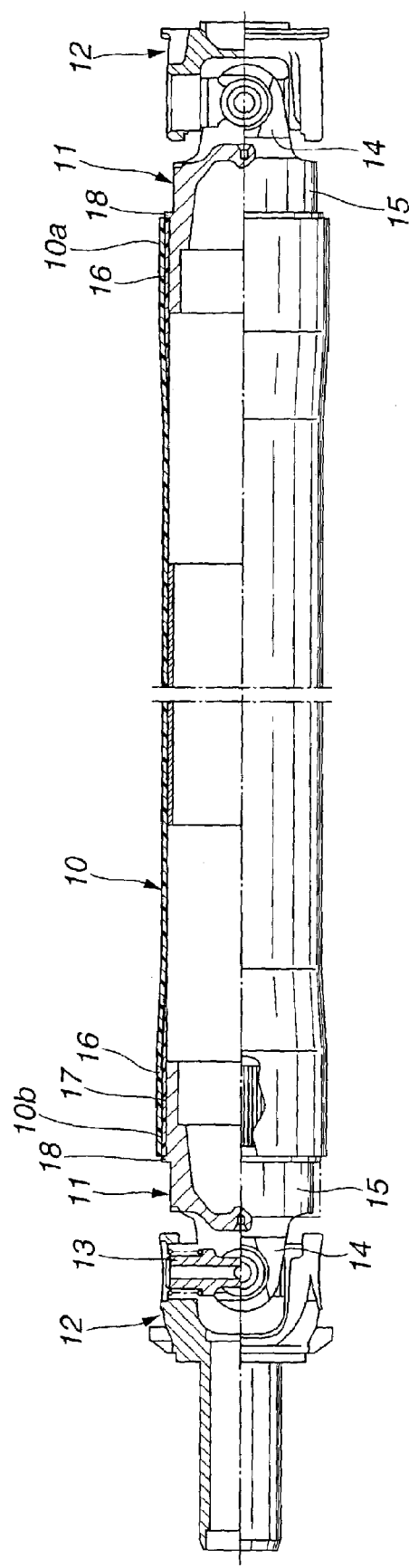
FIG. 4 is an upper half cross-sectional view showing a coupling member of the same embodiment.

FIG. 4 shows a coupling member of the present invention applied to a drive shaft for a vehicle. A cylindrical drive shaft 10, made of carbon fiber reinforced plastic (CFRP), comprises two end portions 10a and 10b. First shaft-end yokes 11 and 11 connect to either of two end portions 10a and 10b. One of first shaft-end yokes 11 has coupling portions 14 and 14 linked via a cross-shape spider 13 to a second yoke 12 which in turn connects to a transmission. Another first shaft-end yoke 11 has coupling portions 14 and 14 linked via another cross-shape spider 13 to a second yoke 12 which in turn connects to a differential gear or like mechanism. Substantially cylindrical fitting portions 15 and 15 to be press fit into end portions 10a and 10b are integrally joined to coupling portions 14 and 14.

Regarding cylindrical drive shaft 10, the inner diameters of both end portions 10a and 10b of the main body, which is an outside layer, are formed in a uniform diameter, and inside layers 16 and 16 are disposed within the inner circumference of both end portions 10a and 10b respectively.

Figure 1:
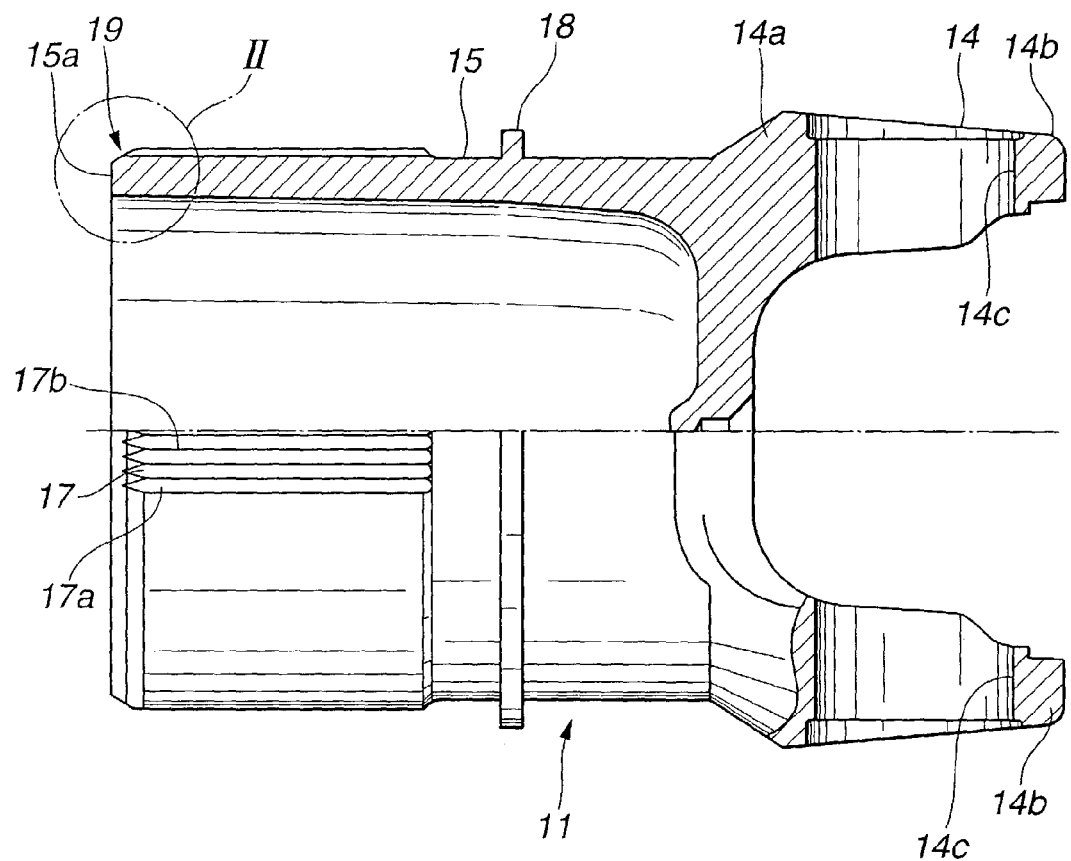
FIG. 1 is an upper half cross-sectional view showing a first shaft-end yoke in a first embodiment of the present invention.
Figure 3:
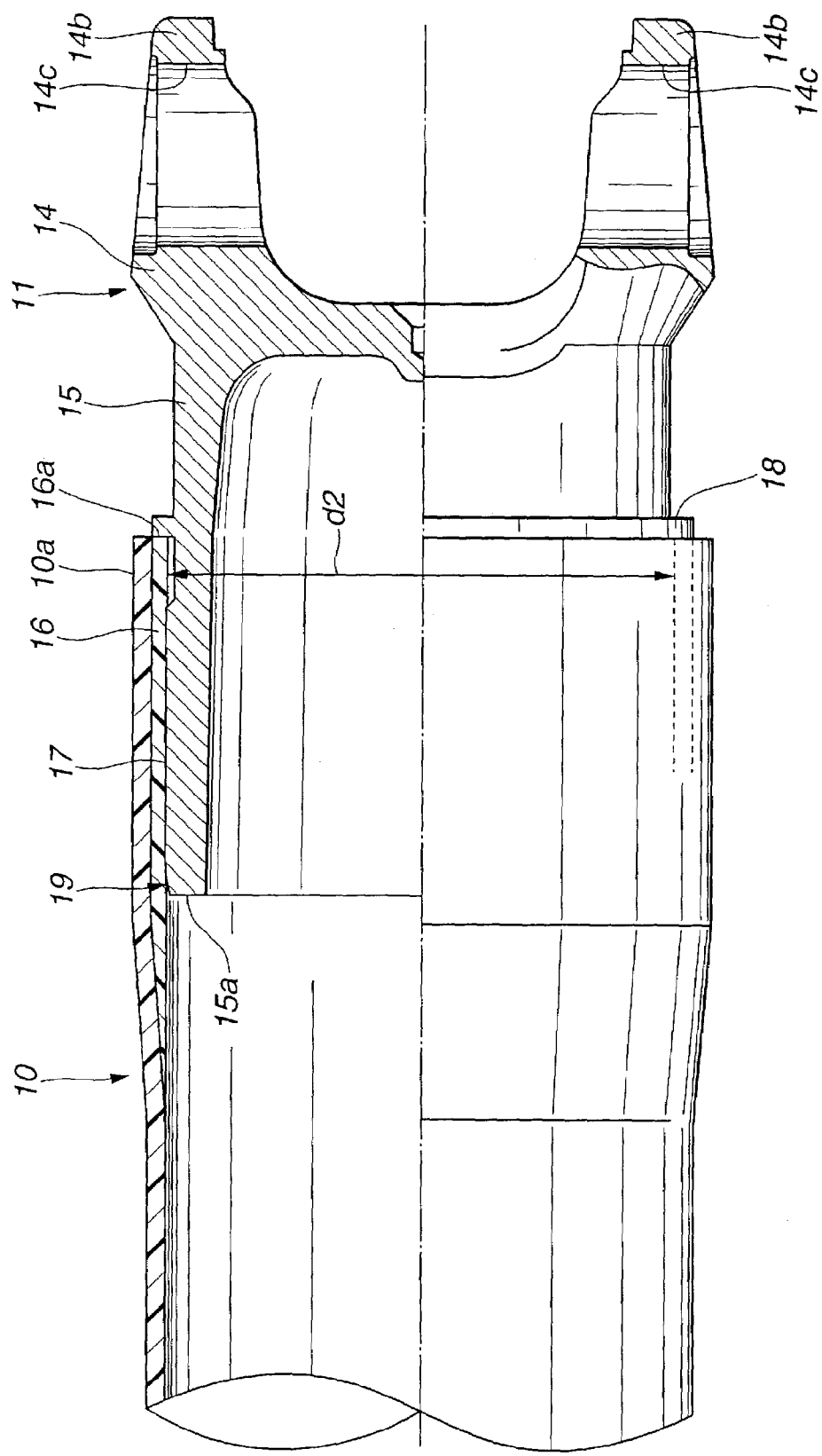
FIG. 3 is an upper half cross-sectional view showing a state of fitting portion being press fit into a cylindrical drive shaft.

Each of first shaft-end yokes 11 comprises coupling portion 14 and fitting portion 15 integrally joined through forging as shown in FIGS. 1 and 3.

Specifically, as shown in FIG. 1, coupling portion 14 is formed from a capped cylindrical base portion 14a, and substantially U-shaped yoke portions 14b and 14b integrally formed at the tip portion thereof with base portion 14a, each having retaining holes 14c and 14c to engage with spider 13. Fitting portion 15 is formed substantially cylindrically, and a serration portion 17 is formed on an outer circumferential surface to serration fit with inside layer 16. A flange portion 18 is integrally formed at a region of the outer circumferential surface toward coupling portion 14 not having serration portion 17.

As shown in FIG. 1, serration portion 17 is formed into a common cross-sectioned trough-crest wave shape, where V-shaped depression portions 17a and upside-down V-shaped ridge portions 17b alternate, and is formed in a predetermined length axially along fitting portion 15, and as well is formed evenly around the full circumference of fitting portion 15.

Referring to FIG. 3, a role of flange portion 18 will be explained, where the outer circumferential surface of fitting portion 15 has been press fitted from the axial direction into end portion 10a of cylindrical drive shaft 10 to serration fit and form part of a functioning power transmission apparatus. In the event a load over a predetermined amount is input into each output shaft yoke 11 and cylindrical drive shaft 10 in the axial direction forcing them into each other from opposing directions, tip surface 16a of inside layer 16 contacts with flange portion 18, and at the same time that inside layer 16 is removably stripped from the outside layer, which is the main body, the outside layer is ruptured so as to absorb the impact.

Figure 2:
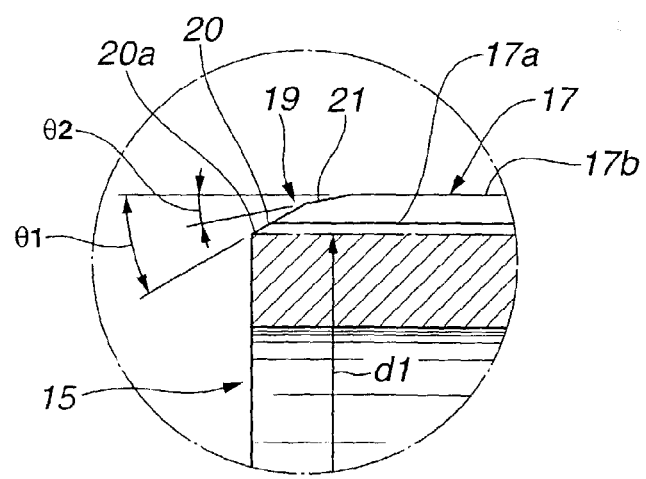
FIG. 2 is an enlarged view of portion II of FIG. 1.

As shown in FIGS. 1 and 2, a tapered guide surface 19 is formed at the edge of the outer circumference of a tip portion 15a of fitting portion 15 to guide press fitting of fitting portion 15 into inner circumferential layer 16 from both end portions 10a and 10b of cylindrical drive shaft 10.

Referring to FIG. 2, guide surface 19 comprises a guide portion 20 at the tip, and a cut away portion 21 closer to the outer circumference than guide portion 20, and a boundary portion of both guide portion 20 and cut away portion 21 is formed substantially into a double surface wide V-shape.

Specifically, guide portion 20 is formed as a tapered conic shape, and a tapering angle $\theta1$ thereof in the first embodiment is set at approximately 30°, and an outer diameter d1 of the edge of a tip 20a is set smaller than the inner diameter d2 of inner circumferential layer 16 of cylindrical drive shaft 10. Depression portion 17a bottom surfaces of serration portion 17 are set at a position which is substantially the center of the inclined surface of guide portion 20.

And as shown in FIG. 2, cut away portion 21 is formed as a tapered conic shape in the same manner, and a tapering angle $\theta2$ thereof in the first embodiment is set at approximately 10°, and is set sufficiently smaller than tapering angle $\theta1$ of guide portion 20.

Thus, according to this first embodiment, during permanent press fitting of fitting portions 15 and 15 of each first shaft-end yoke 11 into both end portions 10a and 10b of cylindrical drive shaft 10 using a predetermined device during assembly of the comprising parts, once guide surface 19 of each of fitting portions 15 and 15 is pressed against the outermost inner edge of inner circumferential layer 16 of each end portion 10a, 10b of cylindrical drive shaft 10, guide portion 20 of guide surface 19 first contacts with the inner edge of tip surface 16a of inner circumferential layer 16, and while positioning the respective axial centers of cylindrical drive shaft 10 and fitting portion 15 so as to form a single axis, fitting portion 15 is guided into cylindrical drive shaft 10. Tapering angle $\theta1$ of guide portion 20 is formed comparatively larger, so fitting portion 15 is easily guided inward into inner circumferential layer 16.

Then, as fitting portion 15 is gradually pressed further inward under a predetermined pressure, after being guided by guide portion 20, cut away portion 21 having a smaller tapering angle next contacts with the edge of the inner circumference of inner circumferential layer 16 of cylindrical drive shaft 10, and serration ridge portions 17b dig into the inner circumferential surface of inner circumferential layer 16 while continuing to be pressed. Here, as tapering angle $\theta2$ of cut away portion 21 is sufficiently smaller than that of guide portion 20, frictional resistance with respect to the inner circumferential surface of inner circumferential layer 16 is small. Thus, serration ridge portions 17b easily cut into inner circumferential layer 16 and it is possible to prevent the occurrence of a stripping effect.

Following this, as shown in FIG. 3, fitting portion 15 is pushed further inward in the same manner and once a face of flange portion 18 has contacted with tip surface 16a of inner circumferential layer 16, further inward movement is blocked.

Therefore, according to this first embodiment, at the initial stage of press fitting of fitting portion 15 into cylindrical drive shaft 10, it is possible to set the axial centers of both of cylindrical drive shaft 10 and fitting portion 15 to coincide with each other owing to guide portion 20 of guide surface 19. Besides being possible to achieve alignment easily, an effective guiding capability is also provided. Thus, use of a device to ensure alignment is unnecessary, and in addition to being able to cut down on costs, it is possible to carry out insertion smoothly due to this guiding capability.

Also, since occurrence of a stripping effect is prevented by the provision of cut away portion 21 having a smaller tapering angle θ2, the ability of serration portion 17 to dig in with respect to the inner circumferential surface of inner circumferential layer 16 is improved, and upon completion of press fitting of fitting portion 15 into inner circumferential layer 16, a decrease in frictional engaging force between fitting portion 15 and inner circumferential layer 16 is prevented. As a result, torque transmission between cylindrical drive shaft 10 and each first shaft-end yoke 11 is more favorable.

And as only tapering angle θ2 of cut away portion 21 is designed smaller, and not the tapering angle of the entire guide surface as with the previous art, increasing the length of fitting portion 15 axially is unnecessary. Thus, it is possible to prevent increases in weight and cost for materials.

Also, since serration portion 17 is formed evenly around the circumference of the outer circumferential surface of fitting portion 15, frictional resistance of fitting portion 15 with respect to the inner circumferential surface of inner circumferential layer 16 is uniform around the circumference after fitting has been completed, and it is possible to ensure large frictional resistance. Thus, torque transmission between cylindrical drive shaft 10 and first shaft-end yoke 11 is further improved.

Figure 5:
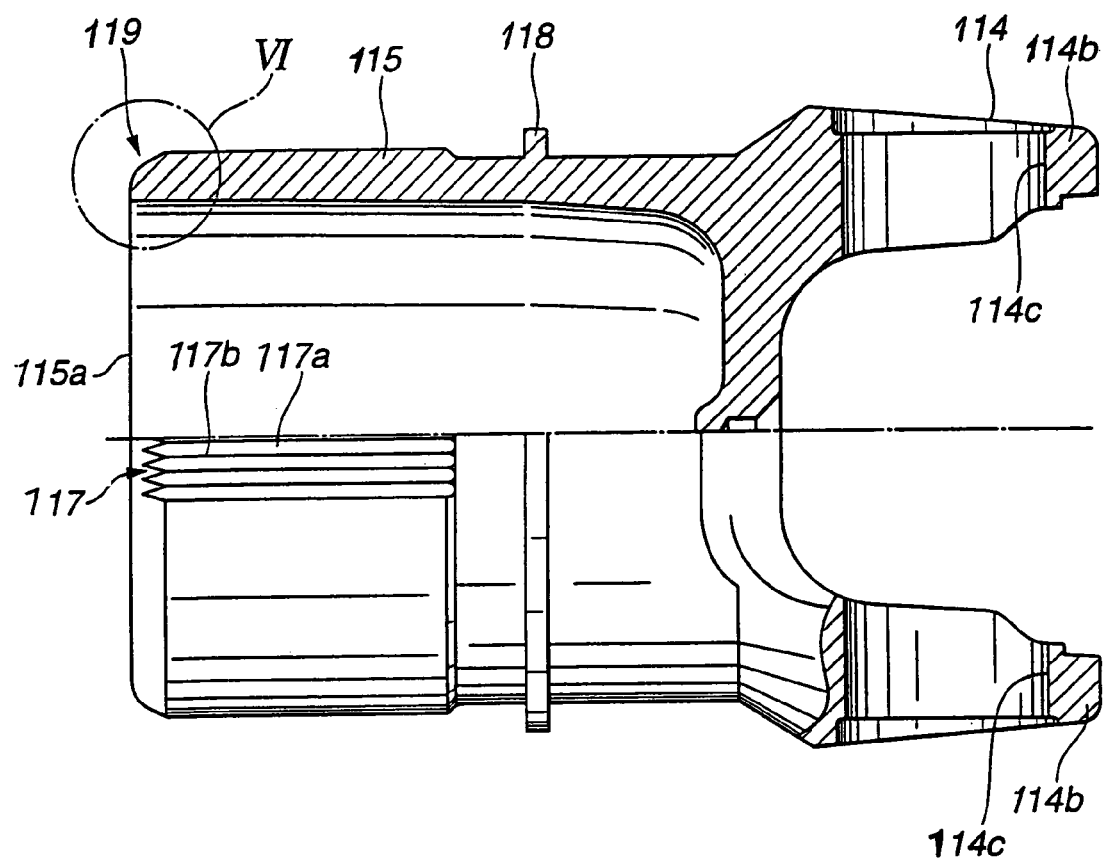
FIG. 5 is an upper half cross-sectional view showing a first shaft-end yoke in a second embodiment of the present invention.
Figure 6:
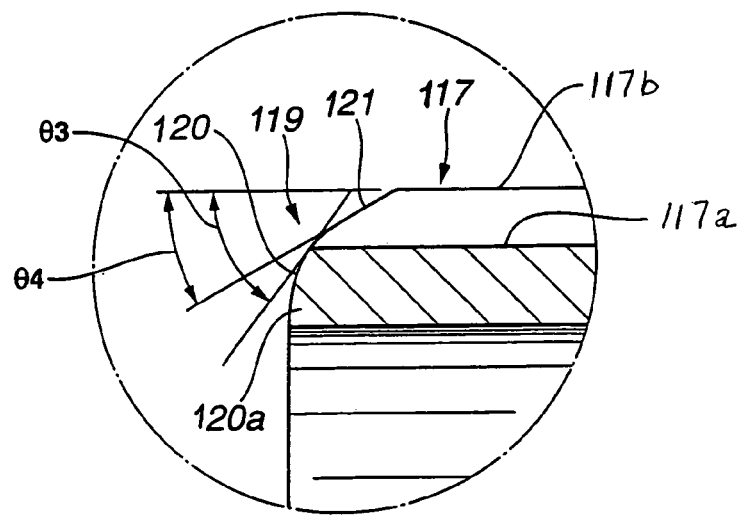
FIG. 6 is an enlarged view of portion VI of FIG. 5.

FIGS. 5 and 6 show a second embodiment of the present invention. The other construction of the second embodiment is the same as that of the first embodiment, and therefore the explanation thereof is omitted herein. A guide surface 119 is formed not as a flat and even tapered surface, but as an arc-shaped tapered surface. That is, a guide portion 120 is formed as a tapered surface that arcs with a comparatively large curvature, and a tapering angle θ3 thereof is set at approximately 55° in the second embodiment. Also, the curvature of a cut away portion 121 is formed as a tapered surface that arcs smaller than guide portion 120, and a tapering angle θ4 thereof is set at approximately 30° in the second embodiment. The bottom portion of serration depression portions 117a is located near the center of guide portion 120.

Thus, according to the second embodiment, a similar effect to the first embodiment is achieved. An effective guiding capability due to guide portion 120 is provided, and it is possible to ensure alignment of cylindrical drive shaft 110 and fitting portion 115.

Also, the occurrence of a stripping effect with respect to inner circumferential layer 116 by serration ridge portions 117b during press fitting is prevented due to cut away portion 121 having a smaller tapering angle θ4, and a decrease of frictional engaging force between fitting portion 115 and inner circumferential layer 116 is prevented, and torque transmission is favorable.

This application is based on a prior Japanese Patent Application No. 2002-129467. The entire contents of Japanese Patent Application No. 2002-129467 with a filing date of May 1, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

For example, the tapering angles of cut away portion 21 or guide portion 20 of guide surface 19 may each be changed as desired to suit the particular size and specifications of the coupling member.

What is claimed is:

1. A coupling member of a power transmission apparatus comprising a fiber reinforced plastic drive shaft to be coupled, the coupling member comprising:
   a fitting portion to be press fitted into the drive shaft, the fitting portion comprising an outer serration portion comprising serrations for digging into an inner circumferential surface of the drive shaft, the serrations including ridge portions,
   a cut away portion continuing from the outer serration portion, the ridge portions extending into the cut away portion, the cut away portion tapering at a first tapering angle, and
   a guide portion continuing from the cut away portion, comprising a free end, the guide portion tapering to the free end at a second tapering angle, a diameter of the free end of the guide portion being smaller than an inner diameter of the fiber reinforced plastic drive shaft,
   wherein the ridge portions of the cut away portion contact with an edge of and cut an inner circumference of the fiber reinforced plastic drive shaft when the outer serration portion digs into the inner circumferential surface of the fiber reinforced plastic drive shaft, and the first tapering angle of the cut away portion is smaller than the second tapering angle of the guide portion.

2. The coupling member as claimed in claim 1, wherein the first tapering angle is approximately 10°.

3. The coupling member as claimed in claim 2, wherein the second tapering angle is approximately 30°.

4. The coupling member as claimed in claim 1, wherein the guide portion is formed as a tapered surface that arcs.

5. The coupling member as claimed in claim 1, wherein the cut away portion is formed as a tapered surface that arcs.

6. The coupling member as claimed in claim 5, wherein the cut away portion is formed as a tapered surface that arcs smaller than the guide portion.

7. The coupling member as claimed in claim 5, wherein the first tapering angle of the cut away portion is approximately 30°.

8. The coupling member as claimed in claim 7, wherein the second tapering angle is approximately 55°.

9. The coupling member as claimed in claim 1, wherein the outer serration portion comprises depression portions, the depression portions extending to a position which is substantially a center of the guide portion.

10. The coupling member as claimed in claim 1, wherein the outer serration portion is formed evenly in the circumferential direction.

11. The coupling member as claimed in claim 1, wherein the outer serration portion is formed in a predetermined length axially.

12. A power transmission apparatus comprising:
   a cylindrical shaft; and a coupling member having a yoke comprising a fitting portion to be press fitted into the cylindrical shaft, the fitting portion comprising:

an outer serration portion comprising serrations, the serrations including ridge portions, a guide portion formed at a free end portion of the fitting portion, a diameter of a free end of the guide portion being smaller than an inner diameter of the fiber reinforced plastic drive shaft, and a cut away portion connecting the guide portion and the outer serration portion, the ridge portions extending into the cut away portion, the ridge portions of the cut away portion contacting with an edge of and cutting an inner circumference of the cylindrical shaft when the outer serration portion digs into the inner circumferential surface of the cylindrical shaft, a tapering angle of the cut away portion being smaller than a tapering angle of the guide portion.

* * * * *